United States Patent [19]

Wolf et al.

[11] 4,413,361

[45] Nov. 8, 1983

[54] DECK AND FENCE STRUCTURE FOR ABOVE GROUND SWIMMING POOLS

[75] Inventors: Donald A. Wolf, Deming, N. Mex.; Clarence G. Smith, Alta Loma; Charles S. Johnson, Cedar Glen, both of Calif.

[73] Assignee: Doughboy Recreational, Inc., Cucamonga, Calif.

[21] Appl. No.: 205,347

[22] Filed: Nov. 10, 1980

[51] Int. Cl.³ .................. E04H 3/16; E04H 3/18
[52] U.S. Cl. ........................ 4/506; 4/488; 52/169.7; 52/169.9
[58] Field of Search ............. 4/488, 506; 52/146, 52/241, 169.7, 169.8, 169.9; 220/1 B, 1 A, 71

[56] References Cited

U.S. PATENT DOCUMENTS

| | | | |
|---|---|---|---|
| 3,335,430 | 8/1967 | Schwarz et al. | 52/169.7 |
| 3,358,761 | 12/1967 | Powers | 52/169.7 |
| 3,553,744 | 1/1971 | Gillen | 52/169.7 |
| 3,557,391 | 1/1971 | West | 52/169.7 |
| 3,574,870 | 4/1971 | Orelind | 52/169.7 |
| 3,584,319 | 6/1971 | Broek | 52/169.7 |
| 3,600,722 | 8/1971 | Diemond et al. | 52/169.7 |
| 3,641,593 | 2/1972 | Goettl | 4/506 X |
| 3,648,301 | 3/1972 | Wiley | 52/169.7 |
| 3,667,071 | 6/1972 | Hoch et al. | 4/506 X |
| 3,877,085 | 4/1975 | Bukaitz et al. | 4/488 X |

Primary Examiner—Henry K. Artis
Attorney, Agent, or Firm—Williamson, Bains, Moore & Hansen

[57] ABSTRACT

A deck structure and fence for above ground swimming pools, with the deck being supported at its inner peripheral end on the seat rest mounted on top of the swimming pool side wall. The deck is comprised of a plurality of platform sections of predetermined size and shape, and by adjusting the distance by which the deck section inner ends overhang the seat rest, the same group of deck sections may be used with round or oval swimming pools having arcuate side walls within a predetermined range of diameters. The outer end of the deck is supported on upstanding posts having lock tabs at both ends. Openings formed through the lock tabs define hinge lines at predetermined locations which cause the lock tabs to be tensioned and prestressed as they are bent into locking engagement with deck frame members and ground support plates through mating apertures therein. A deck fence is held together by a double lock tab arrangement through which the fence top rails are securely interlocked with upright fence posts. A fence mounted on top of the pool wall utilizes connecting arms pivotally bendable on fence posts so as to embrace and attach to the horizontal fence rails at any angular orientation thereof in a horizontal plane.

17 Claims, 16 Drawing Figures

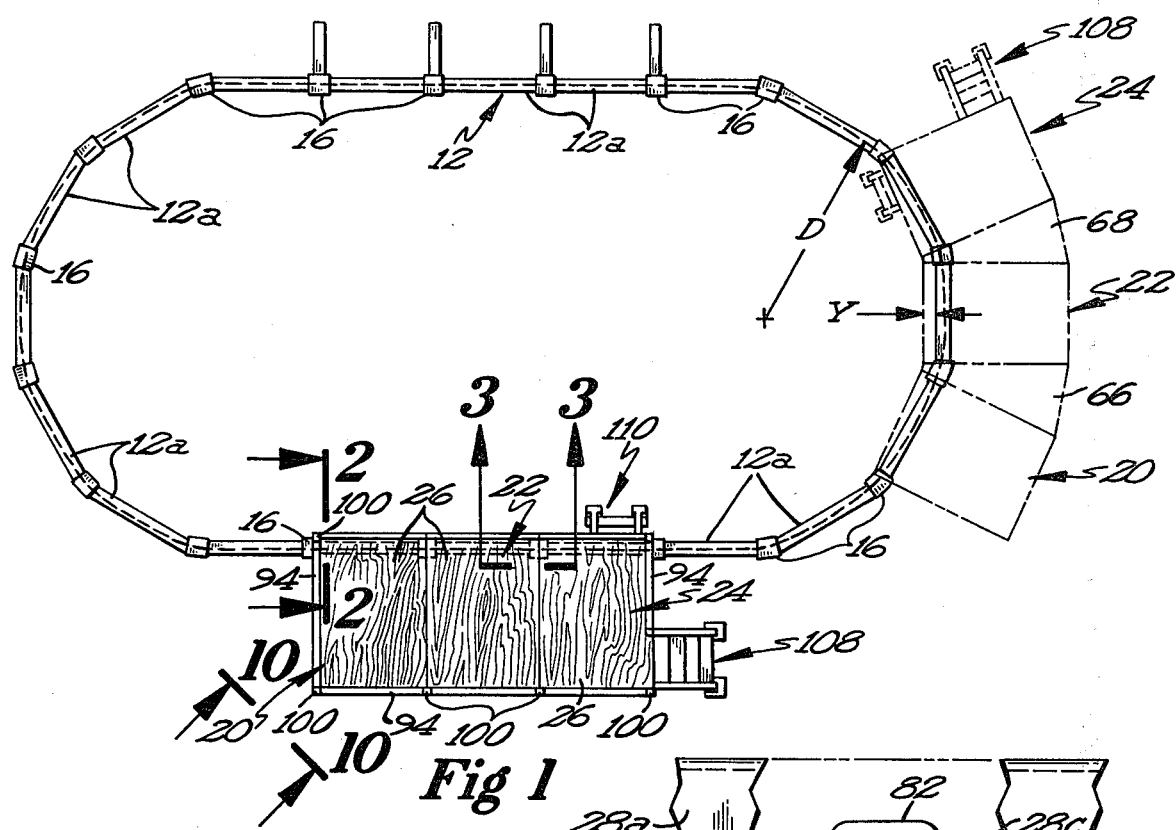
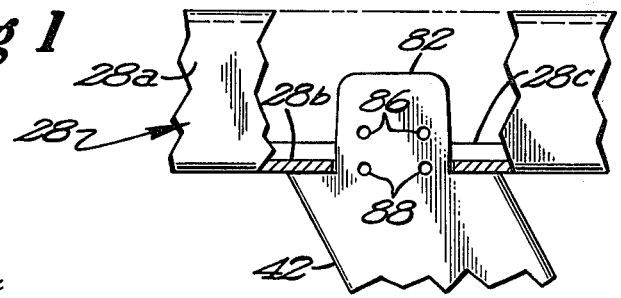
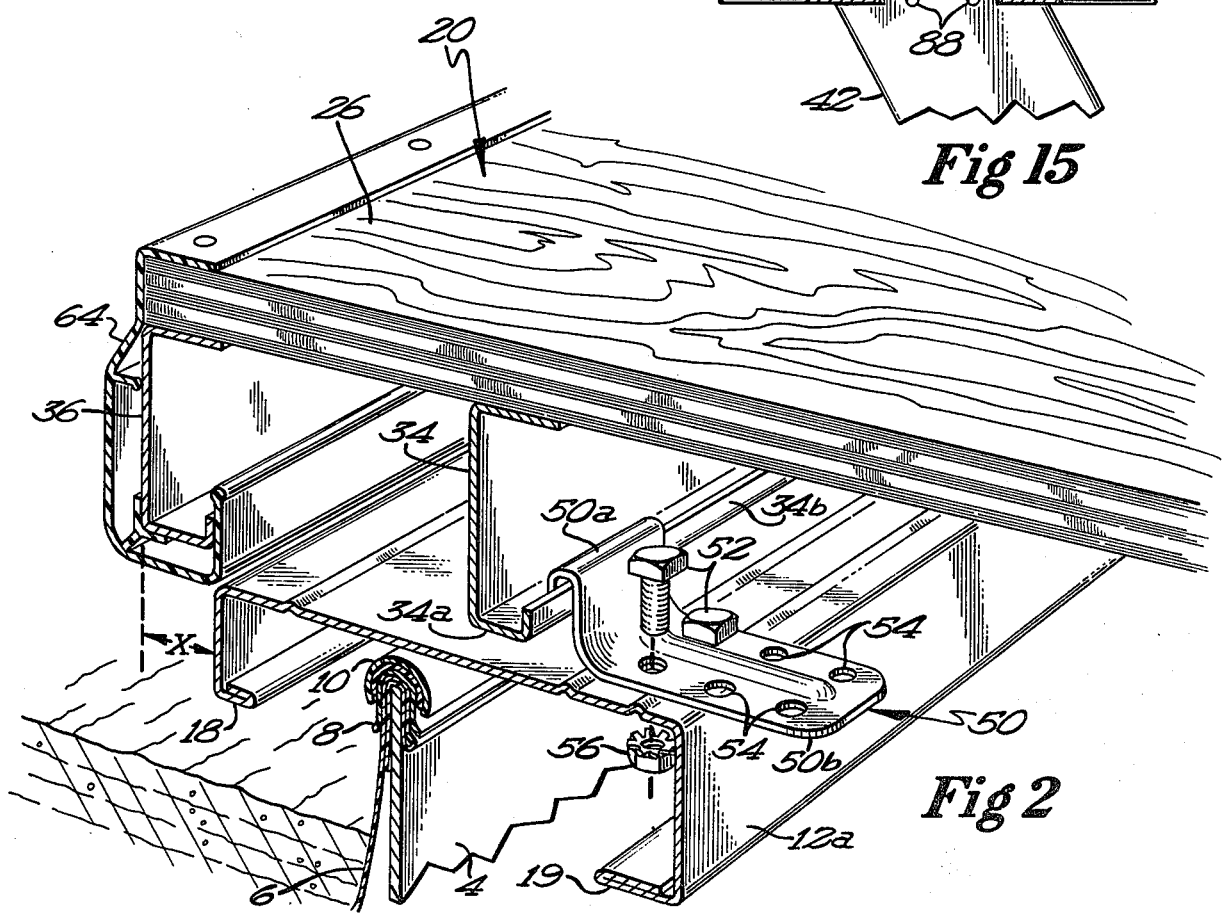

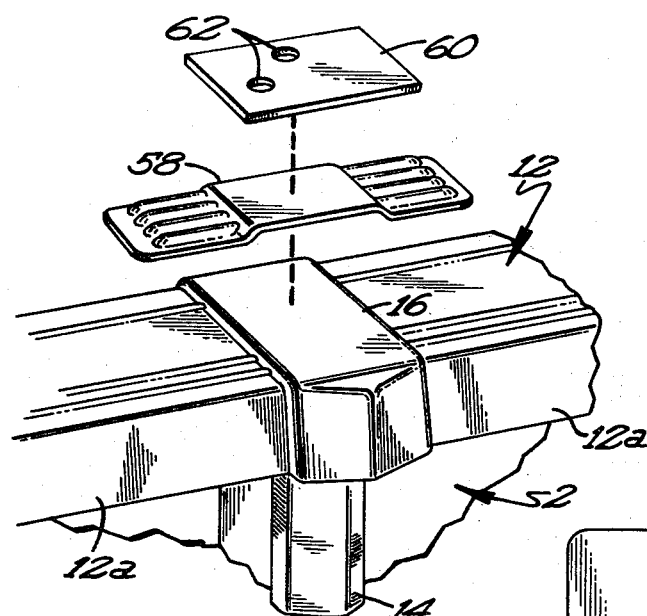
*Fig 3*
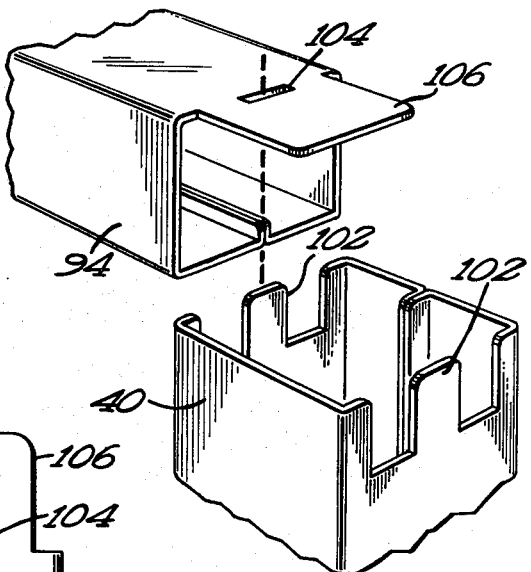
*Fig 4*
*Fig 9*
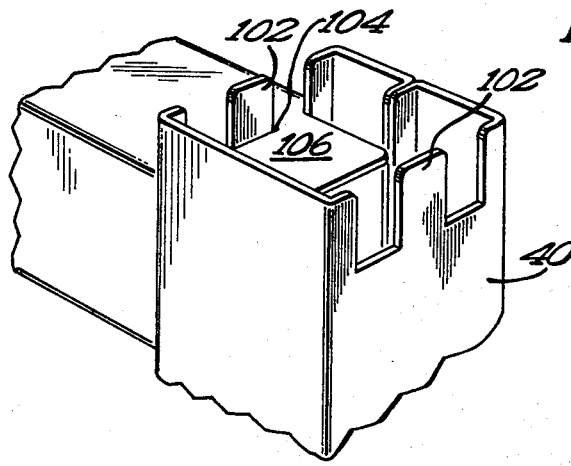
*Fig 5*
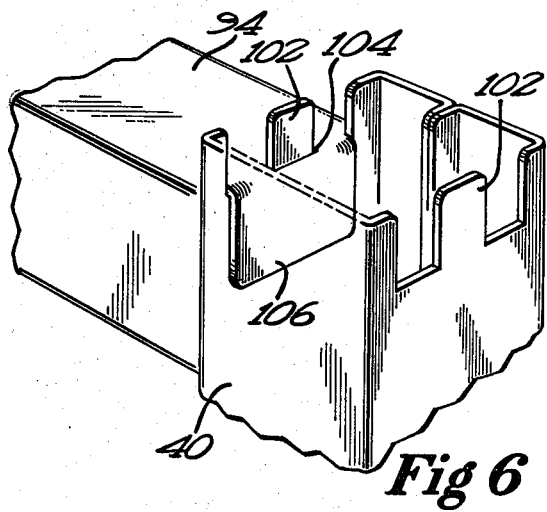
*Fig 6*
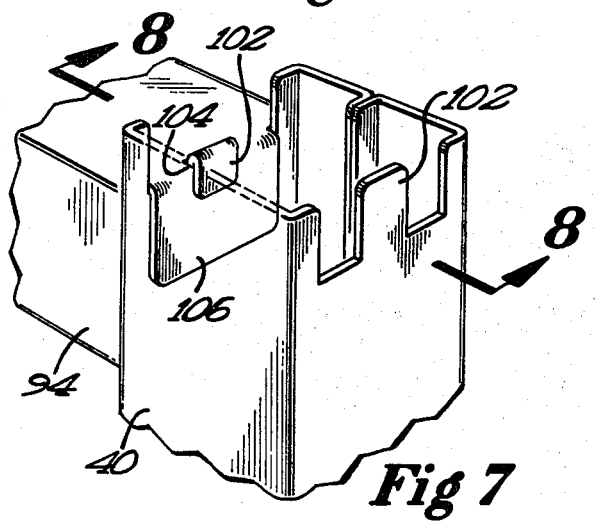
*Fig 7*
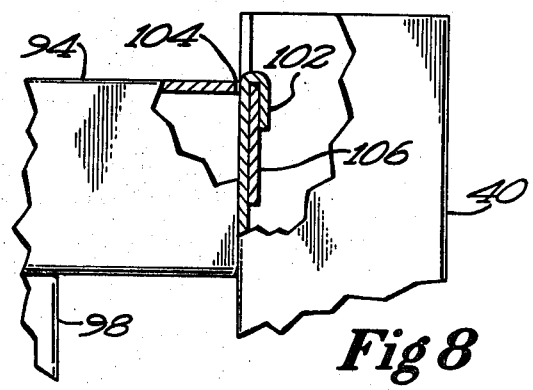
*Fig 8*

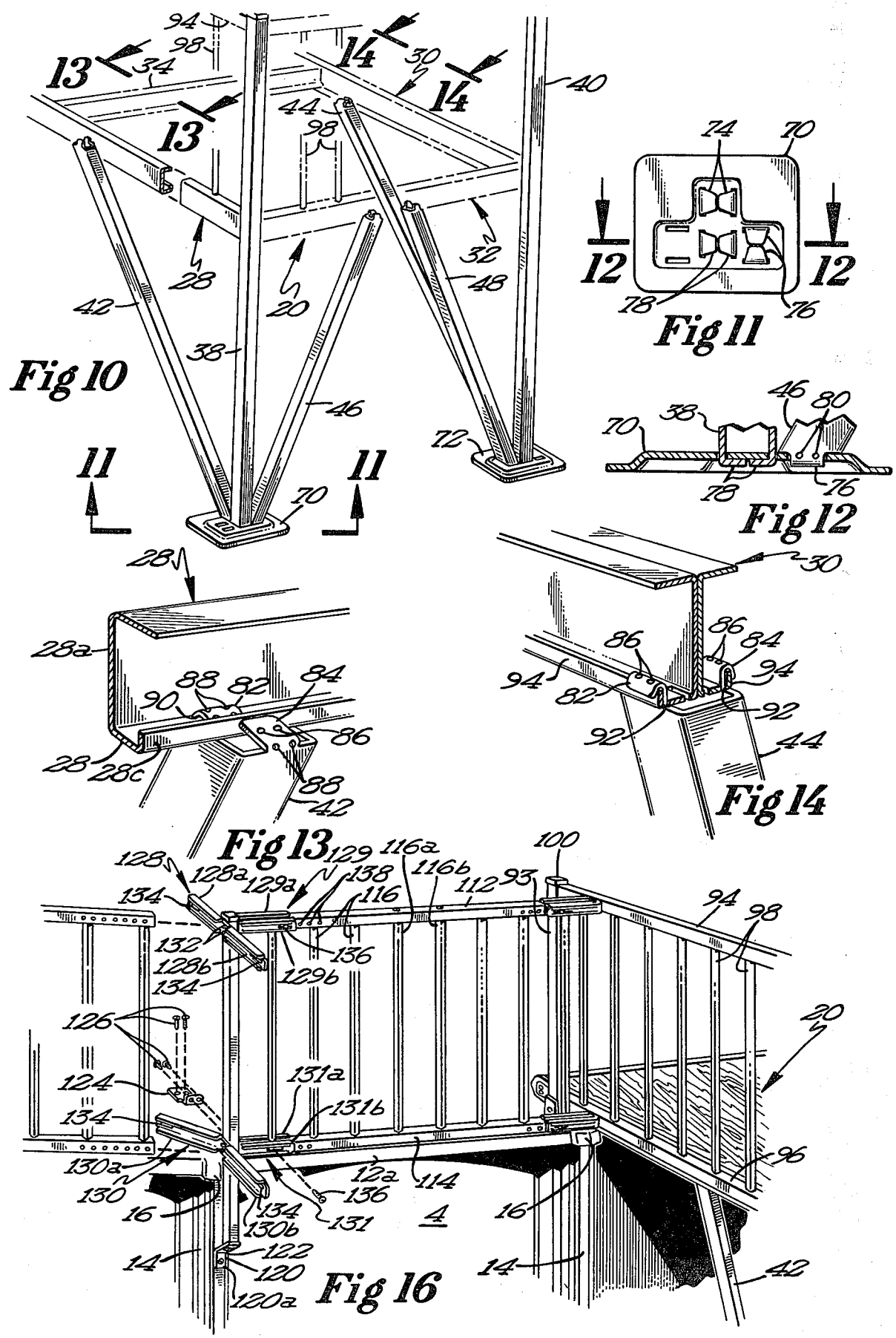

DECK AND FENCE STRUCTURE FOR ABOVE GROUND SWIMMING POOLS

BACKGROUND OF THE INVENTION

Above ground swimming pools of the type having side walls erected in place to form an enclosure with a plastic liner sheet supported from the walls are known. See, for example, U.S. Pat. No. 3,562,822. Such pools are commonly provided with an elevated deck extending along the outside of a portion of the pool wall. It has been the practice in the past to support such decks on special posts erected immediately adjacent the pool sisde wall and outwardly therefrom. Also, special seat rests have been provided which are supported at the upper edge of the pool wall by upright post and bracket structures erected against the pool wall. Such deck and seat rest structures are disclosed in U.S. Pat. No's. 3,274,621 and 3,409,916.

The erection of such prior art deck structures has been expensive, tedious, and time consuming especially with respect to decks large enough to provide a sizable walking and sitting area. This is especially true with respect to round and oval above-ground pools. The deck sections for such circular pools have had to be specially sized and shaped to accommodate the curved walls for each diameter of circular pool or of the curved ends of oval pools. The traditional use of bolts, screws, and special fasteners to secure such decks to support posts and to assemble fencing on top of the deck as well as on top of the pool side walls has also added unduly to the time and expense in erecting such structures.

BRIEF SUMMARY OF THE INVENTION

This invention has as a primary objective the provision of a deck structure for round and oval aboveground swimming pools which can be quickly and easily assembled in a structurally strong arrangement in combination with seat rests utilized on top of the pool side walls.

This objective is realized by supporting the deck platform inner end on top of the side wall seat rests, and utilizing upstanding, ground engaging post members to support the outer end of the deck platform at locations remote from the pool side wall. The inner peripheral edges of the deck sections overhang the seat rests by predetermined distances which are adjusted for the particular diameter of the arcuate side wall of the pool with which the deck is used. This deck mounting arrangement permits the same deck sections to be utilized with pools having curved wall sections within a predetermined range of diameters.

The aforesaid deck structure is not only universal in its application to curved pool walls, but also may be installed along straight wall sections of old pools by the use of a plurality of abutting, rectilinear deck sections without the pie-shaped sections which permit them to be assembled in a generally arcuate configuration around curved wall segments.

Preferably, the deck sections are comprised of panels mounted on rigid frames. At least one deck section of each deck assembly is rigidly secured to the seat rest on which its inner end is supported by an anchoring bracket affixed to a beam of the deck section frame and to the seat rest. A further objective is to provide for the quick and easy erection and assembly of the deck sections along pool side walls. For this purpose the outer ends of the deck sections are supported on upstanding, ground engaging posts having lock tabs on their upper ends. These lock tabs are inserted through mating apertures in the frame beams of the deck sections, and are bent into locking engagement therewith. No fasteners of any kind are required to secure the support post to the deck sections. The same lock tab arrangement may be advantageously utilized to secure the support posts to ground support plates.

A particularly tight attachment of the support posts to the deck frame beams is achieved by prepiercing openings in the lock tabs to define bend lines for the tabs at predetermined locations. These bend line openings are so located that the tabs are prestressed by tensioning as they are pulled and bent into place through the mating apertures in the deck frame beams.

As a further advantageous feature, a fence assembled on the deck around its outer periphery is provided with a double lock tab arrangement for connecting the fence top rails to the fence posts. This eliminates the need for using fasteners in assembling the rails to the posts.

The swimming pool structure also includes a fence assembly adapted for relatively quick and simple installation on the top of side walls of pools of varying diameters and shapes. Connector arms bendably affixed to opposite sides of fence posts may be pivotally bent to engage and embrace the top and bottom horizontal fence rails for attachment thereto, regardless of the angular orientation of the fence rails in a horizontal plane.

These and other objects and advantages of the swimming pool structure disclosed herein may be readily understood by reference to the accompanying drawings wherein like reference numerals have been utilized to designate like elements throughout the several views.

BRIEF DESCRIPTION OF THE DRAWINGS

FIG. 1 is a top, plan view of the swimming pool and deck structure of this invention;

FIG. 2 is a fragmentary, vertical section view of a portion of the deck and its mounting arrangement, taken along lines 2—2 of FIG. 1;

FIG. 3 is a fragmentary, perspective view of a portion of the pool side wall structure;

FIGS. 4 through 8 are fragmentary, perspective views showing the method of attachment of a deck fence rail to an upright fence post;

FIG. 9 is a fragmentary, top view of one end of a top fence rail showing its lock tab;

FIG. 10 is an elevation view in rear perspective of a portion of the pool deck structure;

FIG. 11 is a bottom, plan view of a ground support plate utilized with the deck structure of FIG. 10;

FIG. 12 is a section view of the ground support plate and support post assembly taken along lines 12—12 of FIG. 11;

FIG. 13 is a fragmentary, perspective view showing one form of lock tab connection of a deck support post to a deck frame beam and taken along lines 13—13 of FIG. 10;

FIG. 14 illustrates another form of lock tab connection of one of the deck support posts to a deck frame beam;

FIG. 15 is an elevation view, partially broken away and in section, showing the support post to deck frame beam connection of FIG. 13 and taken along lines 15—15 thereof; and FIG. 16 is a rear, perspective view of a section of a swimming pool wall showing a fence assembly mounted thereon.

DESCRIPTION OF THE PREFERRED EMBODIMENTS

With reference to the drawings, there is shown in FIGS. 1–3 an above-ground swimming pool with the improved deck structure of this invention assembled therewith. The pool may of course be of any of a variety of sizes and shapes, an oval pool having curved wall segments at the opposite ends thereof being shown by way of example. The swimming pool enclosure is defined by a continuous, upright side wall structure generally indicated by reference numeral 2. The pool side walls 2 are of a construction known in the art as best shown in FIG. 2. An outer, upright metallic side wall 4 has a final, water containing liner 6 looped over its upper edge. Plastic coping strips 8 of inverted, V-shaped configuration as shown serve to hold the liner in place. Stabilizing rails 10 also preferably of plastic, are snapped in place over the coping strips 8.

Seat rests 12 are supported on top of the side wall structure all of the way around the pool. The continuous seat rest 12 is comprised of a plurality of separate, seat rest segments 12a which rest directly on top of stabilizer rails 10. Seat rests 12a abut in end-to-end relationship over vertical, side wall posts 14 laterally spaced apart around the pool wall structure. Seat rests 12a are attached to the top of wall posts 14 under connector plates 16, whereby the spaced-apart posts 14 serve to support seat rests 12a extending therebetween. Seat rest connector plates 16 indicate the location of laterally spaced posts around the pool in FIG. 1. Seat rests 12a are shaped as shown in FIG. 2 with downwardly extending side walls having inwardly projecting segments 18 and 19 at their bottom ends bent over as shown to lend strength and rigidity to the seat rests.

A deck assembly is provided for erection at an elevated position outside of the pool side wall structure. The deck assembly is so constructed and mounted that it may be quickly and easily installed either around an arcuate wall segment of a round or oval pool as illustrated in phantom lines in FIG. 1, or along a straight side wall segment of a pool as shown in solid lines in FIG. 1. The deck construction is essentially the same in either case, and will be explained first with respect to the straight side wall mounted deck by reference to FIGS. 1, 2, and 3. Preferably, the deck is comprised of a plurality of rectilinear sections generally indicated by reference numerals 20, 22 and 24. Three of such deck sections are normally utilized in abutting, side-by-side engagement for a straight deck along a straight segment of a pool side wall as illustrated in FIG. 1. As may be noted most clearly by reference to FIG. 2, each deck section includes a generally horizontally oriented panel 26, which may be wood, or laminates of wood, and strengthening panels. Each of the deck panels 26 is supported on a rectilinear, rigid frame made up of a plurality of interconnected beams. The rigid beams 28, 30, and 32 defining the left, right, and rear peripheral edges of deck section 20 are shown in FIGS. 10, 13, and 14. Each of the other deck sections 22 and 24 have similar frame beams, interconnected by a plurality of cross beams, two of which are shown at 34 and 36 in FIG. 2.

At their outer ends, each of the deck sections is supported at a remote location from the pool wall on generally upstanding, ground engaging members. With reference to FIG. 10, those ground support members preferably comprise cornerposts 38, 40, relatively long side stabilizer posts 42, 44, and short stabilizer posts 46, 48 which engage the rear frame beams 32. It is to be understood that each of the three deck sections 20, 22, and 24 is supported on such a combination of ground engaging members as is illustrated with respect to deck section 20 in FIG. 10. Frame beams 28, 30, and 32 are preferably affixed to cornerposts 38 and 40 by lock keys on the ends of the frame beams which engage within slots formed in the side walls of the corner posts. This locking and attachment arrangement between the deck frame beams and the corner posts 38, 40 is not shown, and it is understood that other attachment means can be utilized for this purpose.

The inner ends of each of the deck sections 20, 22, and 24 rest on top of and are supported by seat rests 12a as is illustrated with respect to deck section 20 in FIG. 2. At least one of the horizontal cross beams 34 of each of the deck sections is located on top of a seat rest 12a for support thereon. A plurality of anchoring brackets 50 are utilized to properly locate and securely affix the deck sections to seat rests 12a. One of the anchoring brackets 50 is shown in FIG. 2. Support beam 34 is channel shaped, and includes a bottom web 34a and an upstanding flange 34b depending therefrom. Anchoring brackets 50 include a hooked segment 50a which opens downwardly and is hooked over upstanding flange 34b on cross beam 34 and interlocking engagement therewith. Beam 34 is securely affixed to seat rest 12a by bolts 52 attached through apertures 54 in flat end segment 50b of anchor bracket 50. For this purpose holes are drilled in the top wall of seat rests 12a in alignment with apertures 54 to receive bolts 52. Lock nuts 56 hold bolts 52 in place and pull the deck sections down tightly against the top of the seat rests.

The deck sections 20, 22, and 24 are sized and positioned so that their inner corners are in vertical alignment with side wall vertical posts 14. This ensures that the load from the inner end of the deck is transmitted to vertical posts 14 through seat rests 12a. Saddle plates 58 are positioned over seat rest connector plates 16 as illustrated in FIG. 3, and cushioning pads 60 are placed on top thereof under the front corners of the deck sections. Cushioning pads 60 take up compression as the anchor brackets 50 are tightened by bolts 52. Saddle plates 58 serve as rest supports and load distributors for the corners and side beams of the deck sections. Apertures 62 in cushioning pads 60 are aligned with downwardly depending bolt heads protruding from the deck frames.

The deck sections for the straight deck assembly showed along a straight side wall of the oval pool in FIG. 1 are located so that their inner edges overhang the inner edge of the seat rests 12a by a predetermined distance X as shown in FIG. 2. This overhang distance is preferably on the order of one inch for such straight, side-mounted decks. Vinyl protective cushions 64 are snapped in place as shown in FIG. 2 over the inner edges of the deck sections to provide a protective facing on the front deck edge.

The same rectangular deck sections as illustrated in 20, 22, and 24 may be utilized to form a deck around an arcuate wall segment of a round pool or of the curved end of an oval pool as illustrated in phantom lines in FIG. 1. The center deck section 22 is first installed over a seat rest 12a with its inner edge 22a substantially parallel to the seat rest as shown in FIG. 1. The left and right wing deck sections 20 and 24 are then installed over adjacent seat rest sections in overlying, vertical alignment with vertical side wall posts 14. Wing sections 20 and 24 are angularly oriented with respect to center deck section 22 in a horizontal plane to define pie-shaped spaces therebetween with sides which open outwardly away from the arcuate side wall of the oval pool. These pie-shaped spaces are covered and filled with pie-shaped deck sections 66 and 68, thereby forming a deck of generally arcuate configuration conforming to the arcuate and wall of the oval pool. Whether this arcuate wall is the end wall of the oval pool or an arcuate segment of a round pool, it will have a predetermined diameter "D" as shown in FIG. 1. Seat rest sections 12a are straight lengths which are arranged substantially as cords of an arcuate pool wall. The inner edge 22a of central deck section 22 is positioned to overhang the inside edge of a seat rest section 12a a predetermined distance "Y" for the particular diameter of the arcuate wall segment around which the deck is being mounted. The same group of deck sections of particular size and shape, including pie-shaped sections 66 and 68, may be used to form a generally arcuately extending deck around arcuate wall sections of aboveground swimming pools within a predetermined range of diameters by adjusting the distance "Y" by which the deck section inner edges overhang the inside edges of the seat rest sections. For example, with a round pool having a 16 foot diameter, the overhang dimension "Y" will be 2⅜ inches; and for a round pool having an 18 ft. diameter, the overhang dimension "Y" would be ¾ inch with the identical group of deck sections. As noted above, the overhang dimension "Y" is set by first positioning the center deck section 22 at the predetermined overhang distance, and then angularly positioning the wing deck sections 20 and 22 so that their inner corner are positioned immediately adjacent to the front corners of the center deck section 22.

The outer end of the arcuate deck section shown in phantom line in FIG. 1 is supported on upstanding, ground-engaging members in the same manner as the remote, outer ends of the deck sections described above with respect to the straight deck section shown in solid lines in FIG. 1. Outer or rear frame beams, not shown, are connected between the rear frame beams 32 of the rectangular deck sections 20, 22, and 24 in order to provide a frame support for the pie-shaped deck sections 66 and 68.

Side and rear beam stabilizer posts 42, 44, 46, and 48 for the deck sections are supported at their bottom ends, along with corner posts 38 and 40, on ground engaging support or base plates. Two of such base plates are shown at 70 and 72 in FIG. 10. The bottom ends of corner posts 38 and 40 are positioned on base plates 70 and 72 between the bottom ends of the inclined stabilizers 42, 44, 46, and 48 as shown. This support arrangement ensures a balancing of the loads transmitted through the corner posts and the stabilizers on base plates 70 and 72, with the deck load thus being transmitted evenly through the base plates to the ground.

Slots are formed in base plates 70 and 72 to receive lock tabs 74, 76, and 78 on the bottom ends of the corner posts and stabilizers. As is illustrated in FIGS. 11 and 12, these lock tabs are inserted through the slots in the base plates and bent over in locking engagement therewith. Holes 80 are punched in the bottom ends of the corner posts and stabilizers so as to form bend lines for the lock tabs 74, 76, and 78 at predetermined locations.

A similar lock tab arrangement is utilized to attach the upper ends of the stabilizers to the deck section frame beams, thereby eliminating the need for fasteners of any kind. As is shown in FIGS. 11, 13, 14, and 15, the side and rear stabilizers have lock tabs formed on their upper ends. Relatively long, side stabilizers 42 and 44 are formed with upper lock tabs 82 and 84 having two sets of holes 86 and 88 prepunched therein to predetermined bend lines for the use of lock tabs. FIG. 13 illustrates the lock tab attachment of side stabilizer 42 to side beam 28 of a deck section. Beam 28 is of the channel shape shown having a vertical side wall 28a and a bottom web 28b from which flange 28c projects upwardly at its inner edge. A tab slot 90 is formed in bottom web 28b substantially at its juncture line with beam side wall 28a to serve as an aperture for lock tab 82 inserted therethrough. Lock tab 82 is bent over into locking engagement with base web 28b along predetermined bend line established by the center of prepunched holes 28. The other top lock tab 84 of side stabilizer 42 is bent inwardly along bottom bend line holes 88 into engagement with the outer face of upstanding flange 28c as shown in FIG. 13. Advantageously, tab holes 88 are formed in a location adjacent the base of lock tab 82 where their centers will be slightly below the top face of bottom lip 28b of beam 28 when stabilizer 42 is abutted against the bottom thereof as shown in FIG. 15. As a result, as tab 82 is bent over by pliers, it must be stretched along its base section adjoining the metal of side stabilizer 42 in order to bring the center of holes 88 at least even with the top surface of web 28b for bending thereover along the hinge line established by holes 88. This resultant tensioning of lock tabs 82 prestresses them as they are bent downwardly into locking engagement with base web 28b. A particularly tight locking engagement of tabs 82 with deck beams 28 is brought about by this prestressing of the lock tabs through the particular location of punched, bend line holes 88. Relatively short, rear stabilizer posts 46 and 48 are secured to rear frame beams 32 by lock tabs on the upper ends thereof in the same manner as that in which side stabilizers 42 are affixed to side beams 28. It is to be noted that the bend line holes of 80 punched for the lock tabs in the bottom end of the corner posts 38, 40 and the stabilizers may also be offset upwardly along the length of the support post members so as to form a bend line at such a location as to also bring about tensioning and prestressing of bottom lock tabs 74, 76, and 78 as they are bent into engagement with base plates 70 and 72.

Frame beam 30 on the other side of deck section 20 is preferably formed from two, back-to-back channel beams of the configuration shown in FIG. 14. Slots 92 are formed in the bottom webs of these channel beams to receive lock tabs 82 and 84 on the upper end of side stabilizer 44. With this beam structure, lock tabs 82 and 84 are bent around the hinge line defined by top holes 86 punched therein, and turned downwardly into locking engagement with upstanding flanges 94 on the bottom ends of the channel members forming beam 30. Side stabilizers 42 and 44 are identically shaped and formed with identical prepunched lock tabs 82 and 84 at the upper ends thereof. Depending upon the type of deck frame beam to which these stabilizers are secured, one or the other of the prepunched holes 86 and 88 formed in their lock tabs 82 and 84 will be utilized to bend these lock tabs into secure engagement with deck frame beams.

The swimming pool structure also incorporates a fence for the periphery of the deck, as well as an optical fence readily adapted for mounting on top of the swimming pool side wall structure 2. A portion of the deck fencing is illustrated in FIG. 16 as well as in FIG. 1. The deck fence is comprised of a plurality of upright, laterally spaced fence posts located around the outer periphery of deck sections 20, 22, and 24. The upper ends of the ground-engaging corner posts for the deck platforms serve as fence posts along the rear edge of the deck structure. Two of such corner posts are illustrated at 38 and 40 in FIG. 11. Shorter fence posts are attached to the inner side edges of the deck periphery, one of such posts being illustrated at 93 in FIG. 16. Bottom fence rails 96 are attached to the side and rear frame beams of the deck sections. One of the bottom rails 96 is also shown in FIG. 16. Top fence rails 94 extend parallel to bottom fence rails 96 between the upper ends of the fence posts 93, 38, and 40. Top and bottom fence rails 94 and 96 extend generally horizontally. After bottom fence rails 96 are installed, pickets 98 are inserted through holes in the top face of bottom fence rails 96. Laterally spaced pickets 98 are held in vertical positions by attaching their upper ends to top fence rails 94 through apertures therein. After top fence rails 94 have been attached to the upper ends of pickets 98, they are secured at their opposite ends to the fence posts. After the assembly of top rails 94 thereto, all of the deck fence posts are covered at their top ends with caps 100. Caps 100 mark the location of the fence posts around the deck periphery as viewed in FIG. 1.

The upper end of one of the deck corner posts 40 is illustrated in FIGS. 4 through 8. The upper ends of these corner posts as well as the shorter, inwardly positioned deck fence posts 93, are formed to provide hold-down keys 102 projecting upwardly therefrom. The upper ends of the corner posts as shown at 38 in FIG. 10 will have such hold down keys 102 formed on adjacent sides thereof to accommodate the attachment of top fence rails 94 extending along the rear and side of the deck periphery. The upper end of the deck posts which are positioned inwardly of the multiple deck sections 20, 22, and 24 will have hold-down keys 102 on opposite sides thereof for attachment of top fence rails 94 running between the fence post across the rear end of the deck structure. The upper end of deck post 40 is so constructed, with hold-down keys 102 on opposite sides thereof, as shown in FIGS. 4–8.

Each of the top fence rails 94 is provided with horizontally extending, main lock tabs 106 at its opposite ends. Apertures 104 are formed through the top wall surface of the channel-shaped fence rails 94. These apertures 104 serve to receive hold-down keys 102, and also define a bend line for lock tabs 106. Apertures 104 are preferably located adjacent the juncture line of lock tabs 106 with the top walls of fence rails 94. In assembling the deck fencing, keys 102 are first inserted through apertures 104 to temporarily hold top fence rails 94 as pickets 98 are affixed through the bottom thereof. FIG. 5 shows this intermediate step of fence assembly with one of the post keys 102 projecting through top fence rail slot 104. At this stage, keys 102 may be bent backwards slightly towards the fence post to assist in holding the top fence rails in place as the pickets are assembled thereto. After the pickets are in place, main lock tabs 106 are bent downwardly over the adjacent wall of the fence posts with which the connecting fence rail 94 abuts, as illustrated in FIG. 6. Thereafter, hold-down key 102 is bent downwardly over lock tab 106 to the position shown in FIG. 7. This double lock tab arrangement provides a very tight and secure interlock between the top fence rails and the deck fence posts. Hold-down keys 102 ensure against vertical displacement of the top fence rails 94. A final assembly of a top fence rail 94 and post 40 with lock tab 106 and hold-down key 102 bent into place is shown in FIG. 8.

FIG. 9 illustrates in plan view one end of a top fence rail 94, its main lock tab 106, and its aperture 104 for receiving hold-down key 102. Aperture 104 may be located back along the length of the top fence rails 94 in a direction away from their lock taps 106 and away from the fence post to which the rail is connected. Apertures 104, as noted above, define bend lines for lock tabs 106. Such an offset location of apertures 104 would cause lock tabs 106 and the adjacent metal in the top face of fence rails 94 to be stretched and tensioned as lock tabs 106 are bent downwardly around hold-down keys 102. Such stretching and tensioning would be required in order to bring apertures 104 into alignment with the hold-down keys 102 and the top edge of the adjoining side wall of post 40 where the normal bend line location would be. In this manner the fence rail lock tabs would be prestressed in the same way as described above with respect to the lock tabs on the upper ends of the pool deck stabilizers, and thereby provide a very tight joint.

As shown in FIG. 1, a deck to ground ladder 108 and a pool access ladder 110 are provided on the deck structure. The steps of these ladders may be advantageously connected to the ladder side rails by lock tab arrangements similar to those described above with respect to the connection of the deck posts and deck stabilizers to the deck frame beams and base pads.

In addition to the deck fencing, a pool fence is also provided for mounting around the periphery of the above-ground pool on top of the side wall structure 2. FIG. 16 shows a portion of such a pool fence mounted on top of side wall 2. The pool fence is comprised of a plurality of horizontally extending top rails 112, parallel bottom rails 114, and vertical pickets 116 extending between the top and bottom rails. Fence sections are preassembled by connecting a plurality of pickets 116 between top and bottom rails 112 and 114. This is preferably accomplished by inserting the top and bottom ends of the pickets through aligned apertures in the top and bottom rails 112 and 114. Fasteners connected through the top and bottom rails to the end extremities of a pair of the middle pickets 116a and 116b of each fence section serve to hold the top and bottom rails against the opposed ends of the pickets. The fence sections, thus assembled, are connected around the pool wall periphery by attachment to laterally spaced, upright fence posts 118. Fence posts 118 are connected at their bottom ends to the vertical pool wall posts 14 by means of brackets 120. Brackets 120 are formed as straight sections of sheet metal, and prepunched transversely thereof at predetermined locations to form bend lines. Two separate bend line locations are preferably provided in order that brackets 120 will be of a sufficient length for attachment of a post engaging segment 120a to the outside face of the vertical posts 14. Bracket segments 120a are bent downwardly to the vertical attachment position shown in FIG. 16 from a prepunched bend line 122. Sheet metal screws are utilized to fasten bracket segments 120a to vertical posts 14. Fence posts 118 are further secured in place by means of seat mounting brackets 124 through which the posts are attached to seat connector plates 16. One of the seat mounting brackets 124 is shown in exploded view in FIG. 16. These brackets are of right angle shape, and include a base, horizontal segment attached to seat rest connector plates 16, as well as a vertical segment which is affixed to the inside face of fence posts 118. Sheet metal screws 126 are utilized for this purpose. Brackets 120 and 124 serve to firmly secure fence posts 118 to the pool wall structure in vertical positions as shown. It is to be understood that a plurality of fence posts 118 are secured to the pool wall structure in the aforesaid manner. Fence posts 118 are laterally spaced around the pool periphery at the vertical wall posts 14.

For the purpose of attaching fence posts 118 to the top and bottom fence rails 112 and 114, adjustable connector arms 128, 129, 130, and 131 are affixed to the top and bottom ends thereof. These connector arms are preferably sheet metal. Connector arms 128 and 129 are attached at central sections thereof to opposite faces of fence posts 118 at the top end thereof by sheet metal screws. Connector arms 130 and 131 are connected in the same manner to opposite faces of the fence posts 118 near the bottom thereof, but at a location which will be above the pool seat rests 12. These connector arms are affixed to the fence posts prior to the attachment of the fence sections thereto. As initially attached, the connector arms extend parallel to the fence post face on which they are mounted, as is illustrated with respect to adjustable connector arm 128. Holes 132 are prepunched in the adjustable connector arms along opposite sides of the central attachment segment of each arm in vertical alignment. Such prepunched holes are shown at 132 on connector arm 128. Prepunched holes 132 define bend lines about which connector arm outer segments 128a and 128b may be bent to engage the top fence rails 112. Connector arms 129, 130, and 131 are similarly prepunched to form bendable connector arm segments 129a, 129b, 130a, 130b, and 131a, 131b. The preassembled fence sections are positioned between vertical fence posts 118, and secured thereto by means of the adjustable connector arms 128-131. To this end the bendable arm segments of the connector arms are pivotally bent towards each other into abutting contact with the opposite, vertical faces of the top and bottom fence rails 112 and 114, as illustrated in FIG. 16. The bendable, pivotal construction of the rail connector arms 128-131 permits them to be bent to the necessary angle for embracing the opposite faces of the top and bottom fence rails, regardless of the angular orientation of the fence rails in a horizontal plane. Top and bottom fence rails 112 and 114 will assume different angular orientations for different diameters of round and oval pools.

Slots 134 are formed in the outer ends of connector arms 128-131. These slots are aligned with a plurality of holes 138 drilled in the side walls of the top and bottom fence rails 112 and 114. The adjustable connector arms are attached to the fence rails by means of screws 136 fastened through slots 134 and one of the aligned holes 138. A series of holes 138 are drilled in the ends of the top and bottom fence rails. The arrangement of holes 138 and slots 134 permits longitudinal adjustment on the fence sections as they are connected to the fence posts 118 by means of the adjustable connector arms.

It is to be noted with respect to FIG. 16 that the pool fence is connected to the deck fence in the preferred fence arrangement in order to provide a continuous fence around the pool top and the deck outer periphery. End sections of the pool fence are attached to the top and bottom deck fence rails 94 and 96 as shown in FIG. 16. This is preferably accomplished by utilizing a pair of upper and lower rail connector arms 128 and 130, the central, base ends of these arms being attached to the side walls of the top and bottom deck rails 94 and 96 by screws.

It is anticipated that various changes may be made in the size, shape, and structural arrangement of the deck and fence assemblies disclosed herein for above-ground swimming pools, without departing from the spirit and scope of the invention as defined by the following claims:

What is claimed is:

1. In combination with a portable swimming pool having upright side walls, an improved deck, and deck mounting structure comprising:

a continuous, upright side wall structure defining a swimming pool enclosure;

an elongated seat rest supported on top of said side wall structure along at least a portion of the length thereof, said seat rest including a top wall oriented generally horizontally;

an elevated deck positioned outside of said side wall structure along a portion of the length thereof, said deck having an outer end remote from said side wall structure supported on upstanding, ground engaging members, and said deck having an inner end resting on top of said seat rest top wall and supported thereon;

said seat rest is comprised of a plurality of elongated seat rest sections positioned in abutting, end to end relation along the top of said wall structure, and said deck is comprised of a plurality of deck sections, each of which rests at its inner end on top of one of said seat rest sections with its inner edge overhanging the inside edge of the respective seat rest section inwardly of the pool area defined by said side wall structure;

each of said deck sections is comprised of a deck panel affixed to and supported on a rigid frame, each of said frames including at least one generally horizontally extending support beam; and means securing said deck to said seat rest top wall comprising an anchoring bracket secured to said support beam of at least one of said deck sections and removably attached to the seat rest section on which said one deck section rests.

2. A pool and deck structure as defined in claim 1 wherein:

said wall structure includes a plurality of laterally spaced, upright support posts and said seat rest sections are connected together at joints on top of said support posts.

3. A pool and deck structure as defined in claim 1 wherein:

said support beam of said deck section frame is channel-shaped, and includes an upstanding flange, and said anchoring bracket comprises a hooked segment which opens downwardly and is hooked over said flange in interlocking engagement therewith, and said bracket further comprising an apertured segment attached to the top wall of the seat rest section on which said one deck section rests by removable fastener means.

4. A pool and deck structure as defined in claim 1 wherein:
a facing cushion strip is removably affixed to said inner edge of each of said deck sections.

5. In combination with a portable swimming pool having upright side walls, an improved deck, and deck mounting structure comprising:
a continuous, upright side wall structure defining a swimming pool enclosure;
an elongated seat rest supported on top of said side wall structure along at least a portion of the length thereof, said seat rest including a top wall oriented generally horizontally;
an elevated deck positioned outside of said side wall structure along a portion of the length thereof, said deck having an outer end remote from said side wall structure supported on upstanding, ground engaging members, and said deck having an inner end resting on top of said seat rest top wall and supported thereon;
means securing said deck to said seat rest top wall;
said deck comprises at least one deck panel affixed to and supported on a frame formed from support beams;
a plurality of apertures at predetermined locations in said support beams; and
lock tabs on said upstanding, ground-engaging members engaged through said apertures and bent over to provide a tight connection between said upstanding members and said frame beams, said lock tabs being prepierced to define bend lines at predetermined locations relative to surfaces on said support beams about which said lock tabs are bent.

6. A pool and deck structure as defined in claim 5 wherein:
said lock tabs depend freely from the upper end of said upstanding ground engaging members, and at least certain ones of said support beams rest on top of said ground engaging members;
said apertures are formed through selected wall segments of said support beams; and
openings through said lock tabs adjacent the base end thereof where said lock tabs join the upper ends of said ground engaging members, said openings defining bend lines for said lock tabs and being formed at predetermined locations offset inwardly towards said ground engaging members along said lock tab base ends from the normal bend line location defined by the surface of the apertured wall segment of said support beams over which said tabs are bent, whereby said lock tabs stretch at their base ends and are thereby prestressed as they are bent around said apertured beam surfaces to bring said lock tab bend line openings into alignment with said normal bend line location.

7. In combination with a portable swimming pool having upstanding side walls, an improved deck structure comprising:
a continuous, upright side wall structure defining a swimming pool enclosure inside thereof;
an elongated seat rest supported on top of said side wall structure along at least a portion of the length thereof;
an elevated deck positioned outside of said wall structure along a portion of the length thereof, said deck having an outer end remote from said side wall structure supported on upstanding, ground engaging members, and said deck having an inner end positioned adjacent to said side wall structure;
means supporting said deck inner end at said seat rest;
said deck comprises at least one deck panel affixed to and supported on a frame formed from support beams;
a plurality of apertures at predetermined locations in said support beams; and
lock tabs on said upstanding, ground engaging members engaged through said apertures and bent over to provide a tight connection between said upstanding members and said frame beams, said lock tabs being prepierced to define bend lines at predetermined locations relative to surfaces on said support beams about which said lock tabs are bent.

8. A pool and deck structure as defined in claim 7 wherein:
said ground engaging members comprise both vertical and inclined posts;
lock tabs on the bottom end of said vertical and inclined posts; and ground support plates under said deck, each of said plates having a plurality of apertures therein at predetermined locations to receive said lock tabs on the bottom ends of a plurality of both said vertical and inclined posts, said tabs being bent over against said plates, whereby said plates act as force absorbing members and balance the load forces transmitted through said vertical and inclined posts.

9. A pool and deck structure as defined in claim 8 wherein:
said lock tabs on said bottom ends of said vertical and inclined posts are prepierced to define bend lines at predetermined locations about which said lock tabs are bent into locking engagement with said base plate.

10. A pool and deck structure as defined in claim 7 wherein:
said lock tabs depend freely from the upper end of said upstanding, ground engaging members, and at least certain ones of said support beams rest on top of said ground engaging members;
said apertures are formed through selected wall segments of said support beams; and
openings through said lock tabs adjacent the base end thereof where said lock tabs join the upper ends of said ground engaging members, said openings defining bend lines for said lock tabs and being formed at predetermined locations offset inwardly towards said ground engaging members along said lock tab base ends from the normal bend line location defined by the surface of the apertured wall segment of said support beams over which said tabs are bent, whereby said lock tabs stretch at their base ends and are thereby prestressed as they are bent around said apertured beam surfaces to bring said lock tab bend line openings into alignment with said normal bend line location.

11. In combination with a portable swimming pool having upstanding side walls, an improved deck structure comprising:
a continuous, upright side wall structure defining a swimming pool enclosure inside thereof;
an elongated seat rest supported on top of said side wall structure along at least a portion of the length thereof;

an elevated deck positioned outside of said side wall structure along a portion of the length thereof, said deck having an outer end remote from said side wall structure supported on upstanding, ground engaging members, and said deck having an inner end positioned adjacent to said side wall structure;

means supporting said deck inner end at said seat rest;

said deck comprises at least one deck panel affixed to and supported on a frame formed from support beams;

a fence around the outer periphery of said deck comprising a plurality of laterally spaced, upright fence posts, vertically spaced top and bottom rails extending generally horizontally between said posts, and vertical pickets secured in laterally spaced relation between said rails; and a lock tab connection between said top rails and laterally spaced pairs of said fence posts comprising a main tab on each end of said fence rails bent downwardly over a vertical side wall of one of said fence posts against which one end of said rails abut, an aperture in each of said main lock tabs adjacent the juncture line thereof with said fence rails, and a hold down key on said vertical side walls of said fence posts projecting through said main tab apertures and bent downwardly over said main lock tabs in overlying, locking engagement therewith.

12. A pool and deck structure as defined in claim 11 wherein:

said apertures in said main lock tabs define bend lines for said main tabs and are offset inwardly along the lengths of said top fence rails in a direction away from said abutting side walls of said posts and thus away from the normal bend line location defined by the top of said post side walls, whereby said main lock tabs stretch at their base ends and are thus prestressed as they are bent around and down over said abutting side walls of said posts to bring said bend line apertures into alignment with said normal bend line locations.

13. A pool and deck structure as defined in claim 11, and further including:

a pool fence mounted on the top of said side wall structure, said pool fence being comprised of top and bottom rails having a plurality of laterally spaced pickets extending vertically therebetween, and vertical fence posts to which said top and bottom rails are connected, said fence posts being laterally spaced around the pool side wall structure; and adjustable fence rail connectors secured to opposed faces of said fence posts at the top and bottom ends thereof, each of said fence rail connectors comprising an elongated arm attached to one side face of a fence post, and said arms being formed to have bendable arm segments on the opposite ends thereof which are pivotally bendable towards each other in a horizontal plane to embrace the opposite sides of the top and bottom fence rails for attachment thereto at any angular orientation of said fence rails in a horizontal plane.

14. A pool and deck structure as defined in claim 13 wherein:

end sections of said pool fence are attached to said top and bottom rails of said deck fence at opposite sides of said deck structure to thereby form a continuous fence around said pool wall and the outer periphery of said deck.

15. A pool and deck structure as defined in claim 14 wherein:

a pair of said elongated connector arms are fixed to the ends of the top and bottom pool fence rails in embracing relation therewith on said end sections of said pool fence and are connected to the outside faces of said top and bottom fence rails of said deck fence to thereby serve as attachment means between said pool fence and said deck fence.

16. In combination with a portable swimming pool having upright side walls, an improved deck, and deck mounting structure comprising:

a continuous, upright side wall structure defining a swimming pool enclosure;

an elongated seat rest supported on top of said side wall structure along at least a portion of the length thereof, said sea rest including a top wall oriented generally horizontally;

an elevated deck positioned outside of said side wall structure along a portion of the length thereof, said deck having an outer end remote from said side wall structure supported on upstanding, ground engaging members, and said deck having an inner end resting on top of said seat rest top wall and supported thereon;

means securing said deck to said seat rest top wall;

a pool fence mounted on the top of said side wall structure, said pool fence being comprised of top and bottom rails having a plurality of laterally spaced pickets extending vertically therebetween, and vertical fence posts to which said top and bottom rails are connected, said fence posts being laterally spaced around the pool side wall structure; and adjustable fence rail connectors secured to opposed faces of said fence posts at the top and bottom ends thereof, each of said fence rail connectors comprising an elongated arm attached to one side face of a fence post, and said arms being formed to have bendable arm segments on the opposite ends thereof which are pivotally bendable towards each other in a horizontal plane to embrace the opposite sides of the top and bottom fence rails for attachment thereto at any angular orientation of said fence rails in a horizontal plane.

17. In combination with a portable swimming pool having upright side walls, an improved deck structure comprising:

a continuous, upright side wall structure defining a swimming pool enclosure;

an elongated seat rest supported on top of said side wall structure along at least a portion of the length thereof, said seat rest including a top wall oriented generally horizontally;

an elevated deck positioned outside of said side wall structure along a portion of the length thereof, said deck having an outer end remote from said side wall structure supported on upstanding, ground engaging members, and said deck having an inner end resting on top of said seat rest top wall and supported thereon;

said seat rest is comprised of a plurality of elongated seat rest sections positioned in abutting, end to end relation along the top of said wall structure, said side wall structure having at least one segment of generally arcuate configuration of a predetermined diameter, and said plurality of seat rest sections are straight lengths supported on top thereof in angled relation to each other;

said deck is comprised of a plurality of deck sections, each of which rests at its inner end on top of one of said seat rest sections with its inner edge overhanging the inside edge of the respective seat rest section inwardly of the pool area defined by said side wall structure, said plurality of deck sections having straight inner edges and being positioned around said arcuate side wall segment with said inner edges overhanging the inside edges of said seat rest sections a predetermined distance for the particular diameter of said arcuate wall segment, whereby the same group of deck sections may be used to form a generally arcuately extending deck substantially conforming to the arcuate shape of pool wall segments within a range of diameters by adjusting the distance by which said deck section inner edges overhang the inside edges of said seat rest sections, said plurality of deck sections comprising at least three deck sections of substantially rectangular shape, including a center section and at least two wing sections, the inner edge of said center deck section being positioned substantially parallel to the inside edge of a selected one of said seat rest sections at said predetermined overhang distance with respect thereto, and said wing sections being angularly oriented with respect to said center section in a substantially horizontal plane to define V-shaped spaces between said deck sections with sides which open outwardly away from said arcuate side wall segment of the pool;

V-shaped deck sections covering and filling said V-shaped spaces, said rectangular deck sections being separately usable without said V-shaped sections to form a straight deck along the side wall of a pool having straight side walls of extended length; and means securing the inner end of said deck to said seat rest sections.

* * * * *